(12) United States Patent
Hengstenberg et al.

(10) Patent No.: US 11,498,594 B2
(45) Date of Patent: Nov. 15, 2022

(54) WINDOW ARRANGEMENT FOR A RAIL VEHICLE

(71) Applicant: Siemens Mobility GmbH, Munich (DE)

(72) Inventors: Thomas Hengstenberg, Groebenzell (DE); Herbert Kammerloher, Biburg (DE); Thomas Wimberger, Freising (DE)

(73) Assignee: Siemens Mobility GmbH, Munich (DE)

(*) Notice: Subject to any disclaimer, the term of this patent is extended or adjusted under 35 U.S.C. 154(b) by 267 days.

(21) Appl. No.: 16/649,485

(22) PCT Filed: Sep. 24, 2018

(86) PCT No.: PCT/EP2018/075808
§ 371 (c)(1),
(2) Date: Mar. 20, 2020

(87) PCT Pub. No.: WO2019/057971
PCT Pub. Date: Mar. 28, 2019

(65) Prior Publication Data
US 2020/0307654 A1 Oct. 1, 2020

(30) Foreign Application Priority Data

Sep. 25, 2017 (DE) .......................... 10 2017 216 908

(51) Int. Cl.
*B61D 25/00* (2006.01)
*B60J 1/00* (2006.01)
(Continued)

(52) U.S. Cl.
CPC .............. *B61D 25/00* (2013.01); *B60J 1/007* (2013.01); *B60J 1/17* (2013.01); *B60Y 2200/30* (2013.01);
(Continued)

(58) Field of Classification Search
CPC ... B61D 25/00; B60J 1/007; B60J 1/08; B60J 1/16; B60J 1/17; E05F 11/382;
(Continued)

(56) References Cited

U.S. PATENT DOCUMENTS 1,502,887 A * 7/1924 Swensen ................. E06B 7/084
49/73.1
5,480,729 A * 1/1996 Hattori ...................... F16B 5/01
52/793.1
(Continued)

FOREIGN PATENT DOCUMENTS

CN 104963591 A * 10/2015
DE 19537295 A1 * 4/1996 ............. B61D 25/00
(Continued)

OTHER PUBLICATIONS

Hou et al., "Cab side window for rail transit locomotive", Oct. 7, 2015, European Patent Office, Edition: CN104963591A (Year: 2015).*

(Continued)

*Primary Examiner* — Dennis H Pedder
*Assistant Examiner* — Joyce Eileen Hill
(74) *Attorney, Agent, or Firm* — Laurence A. Greenberg; Werner H. Stemer; Ralph E. Locher

(57) ABSTRACT

A window arrangement for a rail vehicle includes a window pane disposed in a movable sliding frame and having at least one open position, a closed position and a transport position. The movable sliding frame is disposed in a window guiding frame, and the window pane has a larger surface than a corresponding window opening of the window guiding frame.

6 Claims, 3 Drawing Sheets

(51) Int. Cl.
*B60J 1/17* (2006.01)
*E05F 11/38* (2006.01)
*E06B 3/44* (2006.01)

(52) U.S. Cl.
CPC ......... *E05F 11/382* (2013.01); *E05Y 2900/51* (2013.01); *E06B 3/44* (2013.01); *E06B 3/4407* (2013.01); *E06B 3/4423* (2013.01)

(58) Field of Classification Search
CPC ............. E05Y 2900/51; E05Y 2900/55; E05Y 2600/56; E06B 3/44; E06B 3/4407; E06B 3/4423; E06B 2003/4438; E06B 2003/4453; B60Y 2200/30
USPC ......... 105/396, 397; 296/146.15, 190.1, 201, 296/216.04; 49/374, 380, 428, 440, 445, 49/449
See application file for complete search history.

(56) References Cited

U.S. PATENT DOCUMENTS

| | | | | |
|---|---|---|---|---|
| 7,942,027 B1 * | 5/2011 | Cassini | ............... | E05B 65/1086 70/95 |
| 8,671,622 B2 * | 3/2014 | Thomas | ................... | E06B 9/04 49/31 |
| 10,167,664 B2 * | 1/2019 | Pretzer | ................. | E06B 3/4407 |
| 2014/0007509 A1 * | 1/2014 | Hulst | .................... | E05F 11/382 49/404 |
| 2019/0202483 A1 * | 7/2019 | Li | .......................... | B61D 25/00 |

FOREIGN PATENT DOCUMENTS

| | | | | |
|---|---|---|---|---|
| DE | 19708840 A1 * | 9/1998 | ............. | B61D 25/00 |
| DE | 102012212001 A1 | 1/2014 | | |
| EP | 20100069104 A * | 6/2010 | ............. | B61D 25/00 |
| JP | S51109509 U | 9/1976 | | |
| WO | WO-2006111870 A2 * | 10/2006 | ............. | B61C 17/04 |
| WO | 2007133170 A1 | 11/2007 | | |

OTHER PUBLICATIONS

Zimmermann, "Frame for mounting of flat elements", Oct. 17, 1998, European Patent Office, Edition: DE19708840A1 (Year: 1998).*

Yeom et al., "Structure of Vertical or Slope Casement Window With Weight Balance Function", Jun. 24, 2010, European Patent Office, Edition: KR201100069104A (Year: 2010).*

Gemeinboeck, "Window raising and lowering mechanism for use in railway vehicle", Apr. 18, 1996, Edition: DE19537295A1 (Year: 1996).*

* cited by examiner

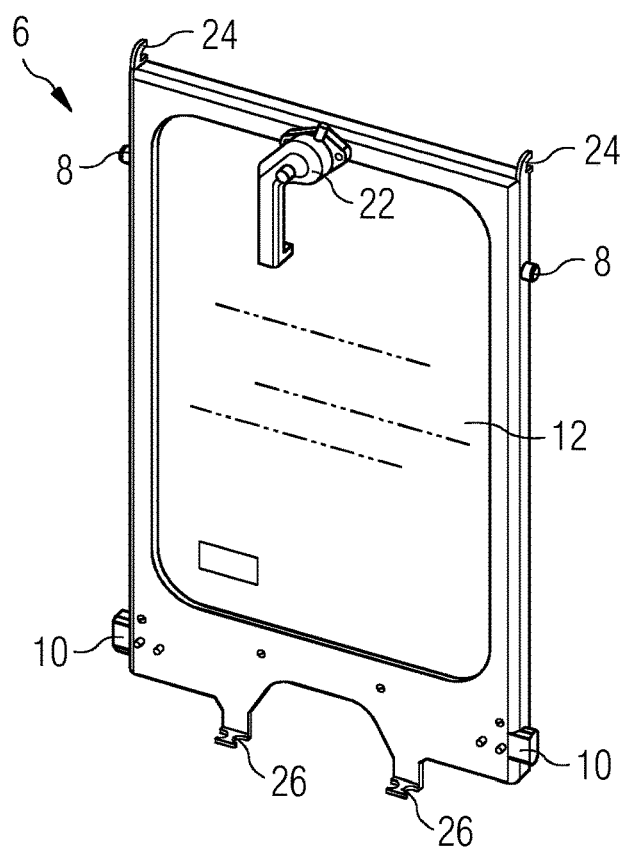
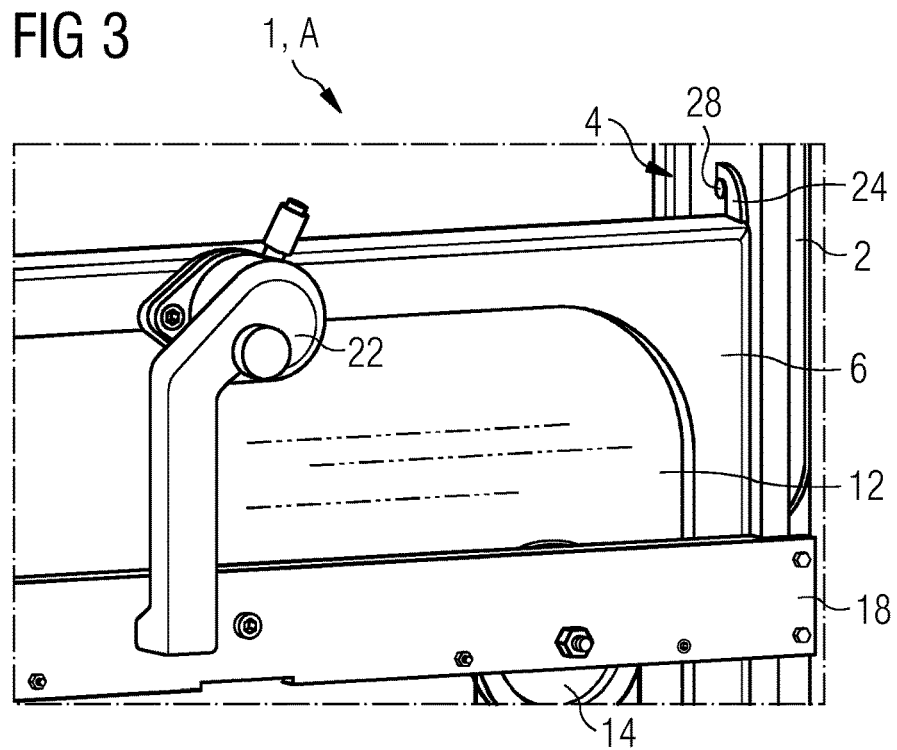

WINDOW ARRANGEMENT FOR A RAIL VEHICLE

BACKGROUND OF THE INVENTION

Field of the Invention

The invention relates to a window arrangement for a rail vehicle, having at least one open position, a closed position and a transportation position for a window panel, which is arranged in a movable sliding frame, wherein the movable sliding frame is arranged in a window-guiding frame.

In rail vehicles, use is usually made of stowage-shaft windows. When in an open position, these windows can be lowered or recessed into a stowage shaft provided by the wall cladding of the rail vehicle. Stowage-shaft windows usually comprise a movable sliding frame, which accommodates a window panel and is arranged in a movable manner in a window-guiding frame. In current stowage-shaft windows, the movable sliding frame comprises, for example, a plurality of extruded profiles which are welded to form an all-round frame and into which the glass panel is adhesively bonded. In the event of the adhesive bonding failing, the glass panel can fall, or tilt, out of the sliding frame and therefore compromise safety. Manufacturers of current stowage-shaft windows therefore have to demonstrate high levels of skill in welding the extruded profiles to form a frame and in the adhesive bonding of the window panel, since the weight of the panel bears predominantly on the extruded profiles, which are welded to form a sliding frame, and on the adhesive bonding between the sliding frame and the window panel, and these components are therefore important from a safety point of view.

In addition, it is necessary for the sliding frame and a counterweight which may possibly be present in the sliding frame to be capable of being arrested during possible transportation or removal of the stowage-shaft window, in order to prevent movable components causing injury or damage. In the case of the stowage-shaft window being designed with a counterweight, it is insufficient here for the window to be locked in the sliding frame just by the usual locking means, as is also done during normal use. New deliveries of stowage-shaft windows are delivered along with, inter alia, wooden inserts, but these have to be kept for a long period of time, or efforts have to be made to purchase them anew, if there is any question of the windows having to be transported again.

SUMMARY OF THE INVENTION

The object of the invention is to propose a window arrangement for which the risk of the window panel falling, or tilting, out of the sliding frame in the event of adhesive bonding failing is minimized.

The object is achieved by the window arrangement described below. Advantageous configurations of the invention form the subject matter of respectively dependent claims.

According to one aspect of the invention, a window arrangement is provided for a rail vehicle, having at least one open position, a closed position and a transportation position for a window panel, which is arranged in a movable sliding frame. The movable sliding frame is arranged in a window-guiding frame. According to the invention, the window panel has a larger surface area than the associated window opening of the window-guiding frame.

The sliding frame is guided in the window-guiding frame and retained by the window-guiding frame via guiding elements, wherein, when the window arrangement is being opened and closed, the sliding frame and the window panel can be displaced vertically upward and downward in the window-guiding frame. In the region for accommodating the window panel, the sliding frame of a stowage-shaft window is designed in the form of an L-shaped metal sheet which is angled all the way around. The sliding frame thus forms a cavity on one side for accommodating the window panel. Over a first peripheral region of the window panel and an edge of the window panel, the window panel is therefore accommodated by the angled sliding-frame region which runs in an L-shaped manner all the way around, whereas a second peripheral region of the window panel is not concealed by the L-shaped region of the sliding frame. The window panel here is greater than the associated window opening, and therefore overlapping with the window panel takes place over at least one peripheral region of the window opening.

The peripheral region of the window opening can be formed here both by a vehicle cladding and by the window-guiding frame. As a result of the window panel being secured in its first peripheral region by the L-shaped profile frame of the sliding frame, and as a result of the window panel overlapping with the peripheral region of the window opening in the second peripheral region of the window panel, the window panel is secured against possibly falling out or tilting in the event of adhesive bonding between the sliding frame and window panel possibly failing As a result of the window panel being doubly secured in its peripheral region on either side, the window panel cannot fall either inward or outward in the event of the adhesive failing; rather, it remains in the envisaged position.

Since the load of the window panel does not bear on the adhesive bonding, the latter is not important here from a safety point of view. The requirements which have to be met by the adhesive bonding can therefore be considerably less stringent. Rather, the adhesive bonding serves predominantly to position the window panel correctly in the sliding frame. It is therefore possible for production to involve a lower level of outlay and to be less cost-intensive.

According to a further embodiment, the sliding frame is cut to size using a laser. The sliding frame is preferably manufactured from a metal sheet or has an extruded profile at least in certain regions in a cavity on one side for accommodating the window panel. A metal sheet can be appropriately cut to the necessary dimensions using a laser. It is possible here, in addition, for further cutouts or necessary apertures to be introduced into the metal sheet using a laser-cutting tool or into the extruded profile by drilling or milling. All the necessary parts or the function or point of attachment thereof can be integrated here in the metal sheet for example using the laser, or in the extruded profile by drilling or milling.

Following the machining by a laser-cutting tool, the metal sheet can preferably be punched and/or deformed/bent into shape. It is possible hereby to introduce, for example, a cavity for producing an L-shaped all-round region for accommodating the window panel.

If use is made of a laser-cutting tool, it is possible to realize manufacturing tolerances which are smaller than those involved in welding. It is also the case that the number of necessary components can be reduced, since for example hooks for accommodating counterweights and transportation locks can be introduced into the sliding frame at the stage where the sliding frame is being produced from a metal sheet. As an alternative to using counterweights, the metal sheet can be configured for the use of a spring mechanism for generating a force which is directed counter to the weight of the sliding frame with a window panel inserted therein.

Sliding frames which are punched and/or bent from metal sheets, and previously machined by laser cutting, can be produced more quickly and economically than multi-part sliding frames from the prior art.

According to a further embodiment, the sliding frame is manufactured from an all-round angled metal sheet. It is preferably the case, for this purpose, that a metal sheet which has previously been cut to size using a laser is angled to form an all-round frame or sliding frame, and therefore the entire frame is formed from just a single all-round piece of sheet metal. This makes it possible to dispense with the operations of welding together, or screwing together, a multiplicity of components. On account of the load exerted by the window panel, many weld seams in a conventional sliding frame can adversely affect the stability of the sliding frame. The welding in the region of the sliding frame therefore has to meet specific requirements, and effort has to be made for the specialist knowledge in this regard to be backed up by specific expertise. The window arrangement according to the invention makes it possible to dispense with welding altogether, and therefore also high-outlay manufacturing steps for welding, straightening and follow-up work, for example grinding or filing or smoothing. This results in production involving a lower level of manufacturing outlay, in the requirements which have to be met by welding being dispensed with and in the variety of parts involved in the production process of the sliding frame being reduced, and therefore in costs being reduced considerably.

According to a further embodiment, the sliding frame borders a larger surface area than the associated surface area of the window opening of the window-guiding frame. This can additionally ensure overlapping of the peripheral region of a window opening in a vehicle cladding or the window-guiding frame. As a result of the sliding frame having larger dimensions than the window opening, it is possible to prevent the sliding frame from falling out of the window opening in a first direction, for example toward an outer side of the rail vehicle. In addition, guidance of the sliding frame in the window-guiding frame can prevent the window panel from tilting in a second direction, for example toward an inner side of the rail vehicle. The sliding frame preferably has window-guiding elements, in which the sliding frame is mounted such that it can be moved preferably vertically in relation to a longitudinal axis of the rail vehicle. The window-guiding elements here retain the sliding frame in its envisaged position and support the sliding frame horizontally on either side.

According to a further exemplary embodiment, an all-round seal is in abutment between the window panel and a periphery which belongs to the window-guiding frame and is overlapped by the window panel. As a result of the window panel having larger dimensions than the associated window opening, the seal butts directly against the window, rather than against the sliding frame. In addition to the L-shaped aperture for accommodating the window panel of the sliding frame, the seal which butts directly against the window panel can secure the window panel against falling out from the side opposite the aperture. Therefore, the window panel is secured on the one side by the L-shaped aperture of the sliding frame, and on the other side by the seal and the window-guiding frame, which overlaps the window panel in the peripheral region, against falling out toward an inner side or an outer side of the rail vehicle. In addition, a seal which butts directly against the window panel can ensure improved thermal insulation.

According to a further exemplary embodiment of the window arrangement, all the points of attachment for guiding elements and/or locking elements, and for a counterweight and/or a spring mechanism, are formed integrally with the sliding frame. As a result, the sliding frame can be formed integrally in a single part, it being possible for the number of components required to be reduced. Installation-related outlay can also be reduced as a result.

According to a further exemplary embodiment, the sliding frame has an integrated transportation lock. In particular for the new delivery or the installation and removal, and the transportation, of the window arrangement with a counterweight already installed, the presence of a transportation lock is necessary in order to provide a safeguard against injury and damage since, if the counterweight is not properly secured, there is a risk of pinching or crushing. A transportation lock can be integrated in the window arrangement at the production stage of the sliding frame. For this purpose, an aperture, for example in the form of a screw mount, is introduced directly when the metal sheet for producing the sliding frame is being machined by laser cutting. The transportation lock allows the counterweight to be secured quickly and straightforwardly. The transportation lock can make it possible here for the sliding frame to be hooked in at a certain position or to be blocked mechanically in some other way.

According to a further embodiment, in a transportation position, the integrated transportation lock can be connected to the window-guiding frame. The transportation lock can be configured in different ways here, for example in the form of a hook, of an eyelet or of a slide. The window-guiding frame preferably has an aperture or an eyelet in which the transportation lock can engage or to which the transportation lock can be connected. If the sliding frame is located in the transportation position, then the transportation lock of the sliding frame can be connected to the window-guiding frame and the counterweight can be blocked. This makes it possible for safety during installation and removal, and during transportation, to be increased considerably and for a transportation lock to be configured in a straightforward manner.

According to a further exemplary embodiment, in a transportation position, the integrated transportation lock can be screwed to the window-guiding frame. The transportation lock here is designed preferably as a surface-area hook formed from the sheet metal of the sliding frame. This surface-area hook, or a round opening in a surface region, can be oriented for example along an upper periphery of the sliding frame, or perpendicularly to the longitudinal axis of the rail vehicle, and can be suitable to be connected in a form-locking or force-locking manner, for example by screw connection, with a corresponding opening or an internal thread which is made in the window-guiding frame or a cladding of the window-guiding frame. The sliding frame can be screwed to the window-guiding frame, or the vehicle cladding, for example using commercially available cylinder-head screws, it being possible for the installation of the transportation lock to be simplified in this way. The transportation lock can be activated at any time merely for example using at least one cylinder-head screw. The transportation lock does not need any other component and is ready for use at all times. The sliding frame can thus be fixed by a form fit between, for example, a standard screw and the sliding frame.

The properties features and advantages of this invention described above, and the manner in which they are achieved, will be more clearly and readily comprehensible on the basis of the explanation of the following, highly simplified schematic illustrations of preferred exemplary embodiments.

BRIEF DESCRIPTION OF THE SEVERAL VIEWS OF THE DRAWING

FIG. 2 shows a perspective illustration of a movable sliding frame, with a window panel arranged therein belonging to the first exemplary embodiment of the window arrangement, FIG. 3 shows an enlarged detail A of the first exemplary embodiment of the window arrangement from FIG. 1.

DETAILED DESCRIPTION OF THE INVENTION

In the figures, the same design elements have the same reference signs in each case.

Figure 1:
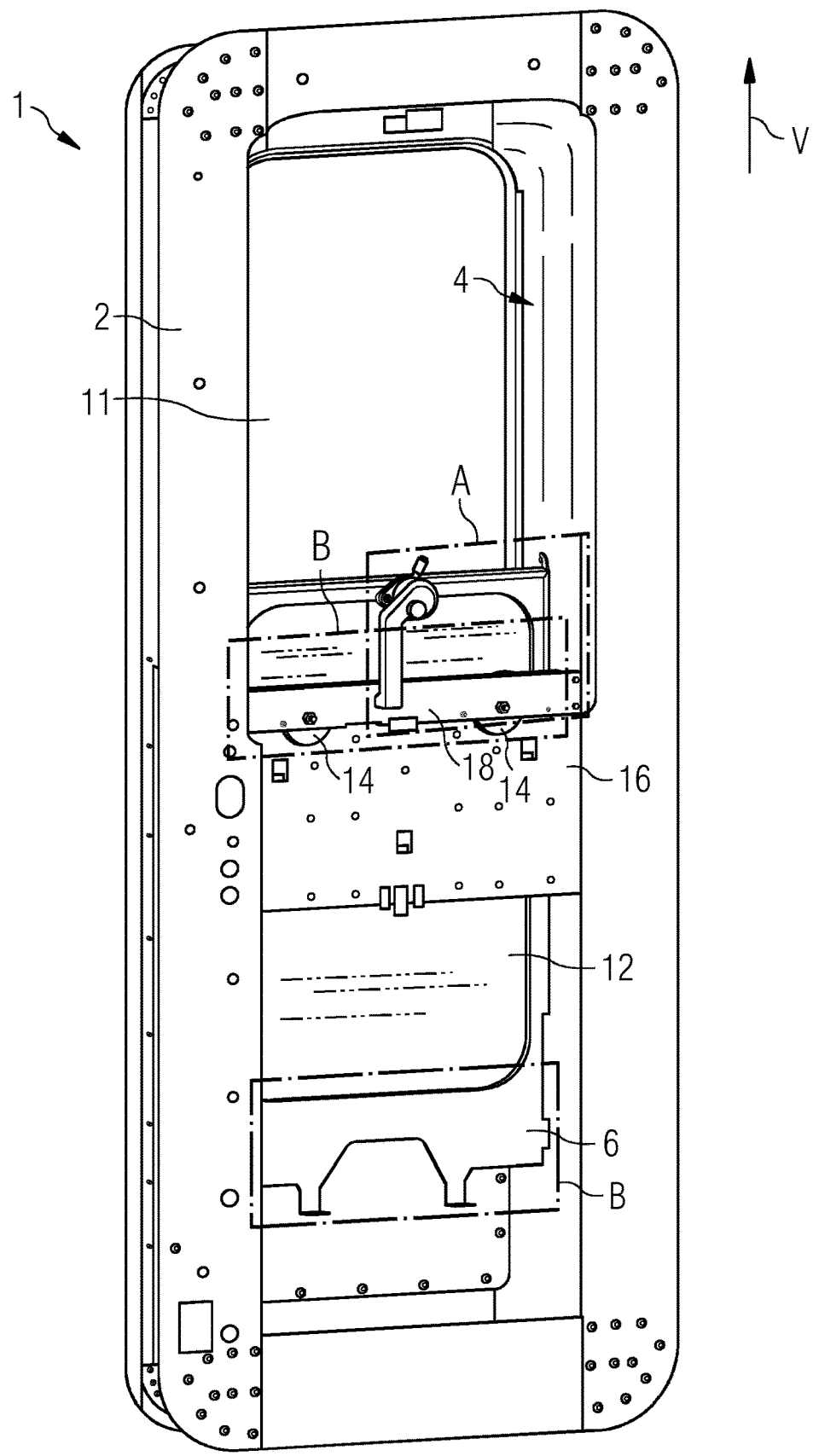
FIG. 1 shows a perspective illustration of a first exemplary embodiment of a rail-vehicle window arrangement in a transportation position.

FIG. 1 shows a perspective illustration of a first exemplary embodiment of a rail-vehicle window arrangement 1 in a transportation position.

The window arrangement 1 has a window-guiding frame 2, which is integrated in a door of a rail vehicle (not illustrated). As an alternative, the window arrangement 1 can also be integrated, or installed, in a side wall of the rail vehicle. According to the exemplary embodiment, the window arrangement 1 is illustrated without cladding, it therefore being possible to see how the respective constituent parts of the window arrangement 1 are constructed.

The window-guiding frame 2 comprises rails 4 for accommodating, and guiding, in a form-locking manner a sliding frame 6, which can be moved in a vertical direction V. The sliding frame 6 has window-guiding elements 8, 10, which are illustrated in FIG. 2 and can be guided in the rails 4 of the window-guiding frame 2.

The sliding frame 6 is arranged such that it can move parallel to a window opening 11 of the window-guiding frame 2. In particular, it is possible for the window opening 11, in a closed state of the sliding frame 6, to be closed and, in an open state of the sliding frame 6, to be freed.

A window panel 12 is arranged in the movable sliding frame 6. In order for an amount of force required for moving the sliding frame 6 to be reduced, the sliding frame 6 is connected mechanically to a counterweight 16 via deflecting rollers 14. The deflecting rollers 14 are positioned in a rotatable manner on a cross-strut 18. The cross-strut 18 is connected at both ends to the window-guiding frame 2 and serves as a boundary element for the counterweight 16. The counterweight 16 is arranged in the window-guiding frame 2 parallel to the movable sliding frame 6 and can be guided vertically on guiding elements arranged parallel to the rails 4.

FIG. 2 shows a perspective illustration of a movable sliding frame 6, with a window panel 12 arranged therein, belonging to the first exemplary embodiment of the window arrangement 1. The sliding frame 6 is manufactured from a metal sheet which is angled all the way around, the sliding frame having been made using a laser. The sliding frame 6 has a cavity on one side for accommodating the window panel 12. The window panel 12 here is connected to the sliding frame 6 by material bonding provided in the form of adhesive bonding 20.

A window closure 22 for connecting the end of the sliding frame 6 mechanically to the window-guiding frame 2 is arranged in the sliding frame 6. Alongside the window closure 22, the sliding frame 6 has vertically upwardly arranged transportation locks 24. In each case one transportation lock 24 is arranged in a row with the window-guiding elements 8, 10, which are positioned on either side. According to the exemplary embodiment, the transportation locks 24 are designed as integral constituent parts of the sliding frame 6, in the form of a hook 24. It is possible for the transportation locks 24 to be screwed to the window-guiding frame 2 in a mechanically releasable manner via conventional screw connections and thus to arrest the sliding frame 6 in order for the window arrangement 1 to be transported.

Two hooks 26 for mechanical connection to the counterweight 16 are arranged on a lower side of the sliding frame 6. According to the exemplary embodiment, the hooks 26 are formed integrally with the sliding frame 6. Steel cables can have one end connected to the hook 26 and one end connected to the counterweight 16. The steel cables here are guided over the deflecting rollers 14, arranged on the cross-strut 18, in order for pulley systems to be formed. This means that less force has to be applied in order for the sliding frame 6, with a window panel 12 arranged in the sliding frame 6, to be moved along the vertical direction V.

FIG. 3 shows an enlarged detail A of the first exemplary embodiment of the window arrangement 1 from FIG. 1. In particular, this figure depicts the arrangement of the sliding frame 6 with the window-guiding frame 2 when the sliding frame 6 is in a transportation position. For this purpose, the window-guiding frame 2 has internally threaded bores in the region of the guide rails 4. The transportation locks 24 can be screwed to the window-guiding frame 2 via screw connections 28. It is therefore possible for the sliding frame 6 and the window-guiding frame 2 to be screwed to one another in an immovable manner and thus to be secured for transportation.

In particular, a transportation position of the sliding frame 6 can be rendered such that the window panel 12 can be concealed with protection being provided at least to some extent by a cladding of the window arrangement 1 or by a strut system of the window arrangement 1. This makes it possible to reduce the risk of damage to the window panel 12 during transportation. Making use of the screw-connection transportation lock 24, 28 renders special transportation locks superfluous. In particular, a transportation lock can be realized using commercially available screws 28.

Figure 4:
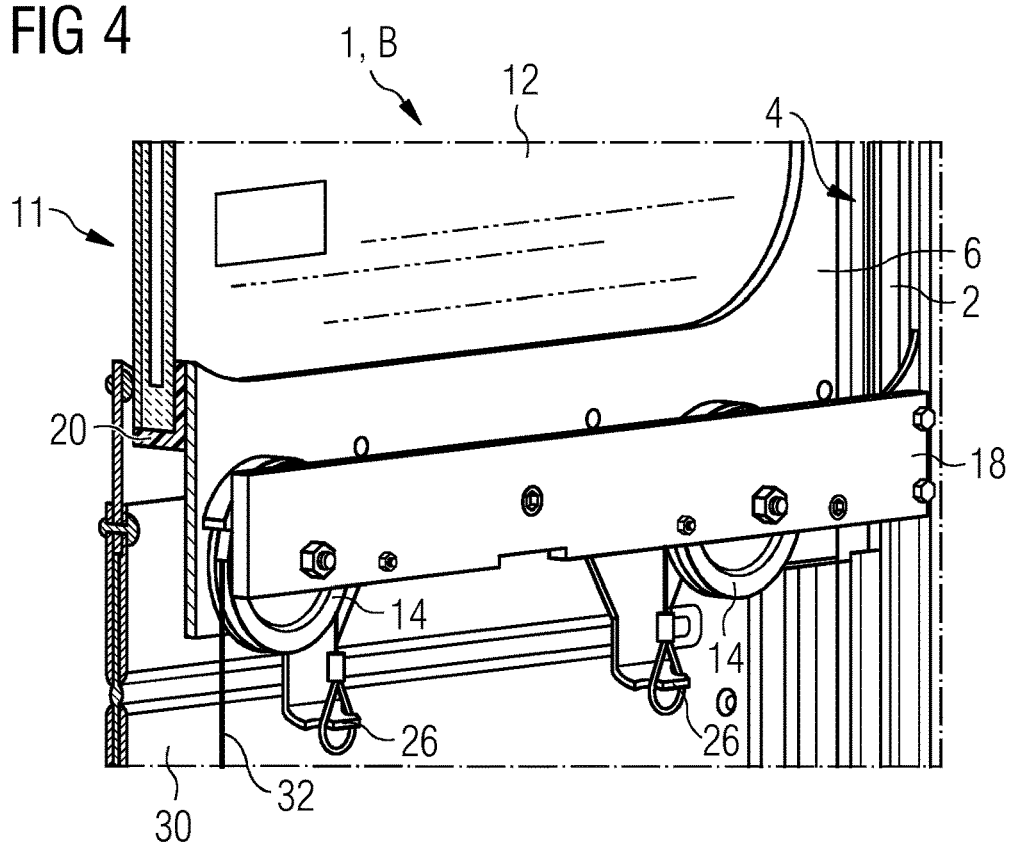
FIG. 4 shows an enlarged detail B of the first exemplary embodiment of the window arrangement from FIG. 1.

FIG. 4 shows an enlarged detail B of the first exemplary embodiment of the window arrangement 1 from FIG. 1. This figure depicts, in particular, the cladding 30 of the window-guiding frame 2 beneath the window opening 11. Also illustrated is the fastening of the steel cables 32 at one end to the hooks 26 of the sliding frame 6.

Figure 5:
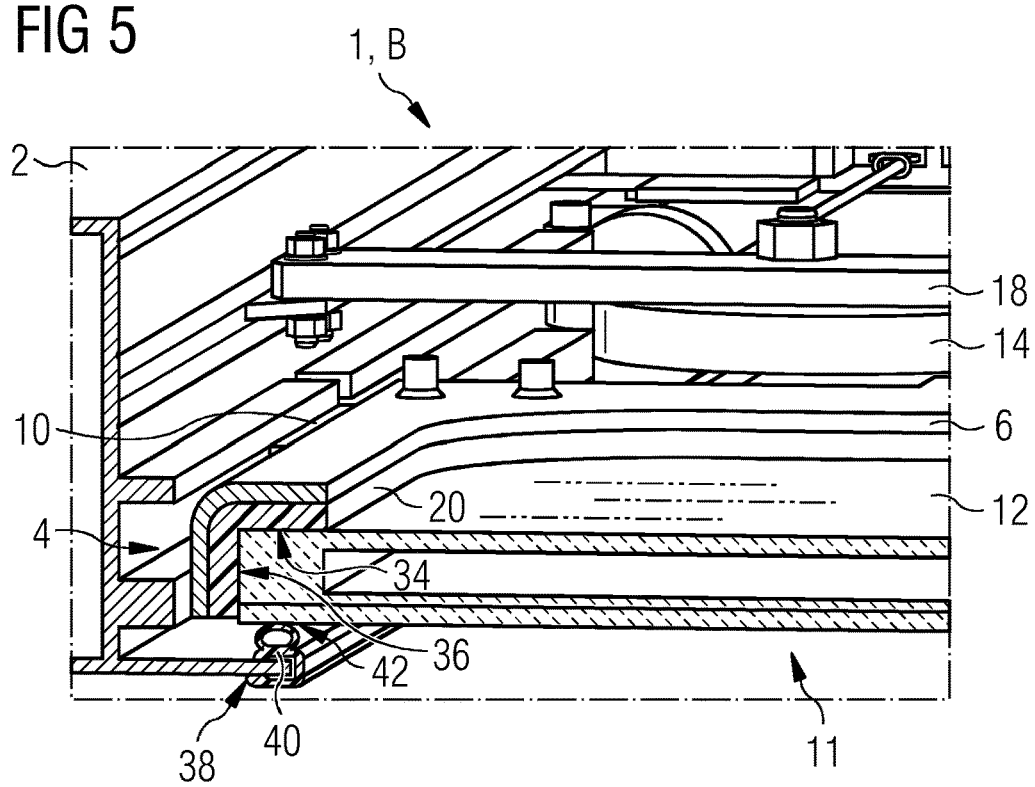
FIG. 5 shows an alternative perspective view of the enlarged detail B of the first exemplary embodiment of the window arrangement from FIG. 1.

FIG. 5 shows an alternative perspective view of the enlarged detail B of the first exemplary embodiment of the window arrangement 1 from FIGS. 1 and 4. This figure illustrates a cross section of the sliding frame 6, which is inserted in the window-guiding frame 2.

The window panel 12 is introduced into the cavity on one side of the sliding frame 6 by means of adhesive bonding 20. The window panel 12 can be, for example, a double-glazed window panel 12, with an air volume enclosed therein, in order to improve the thermal insulation of the window panel 12. The window panel 12 is adhesively bonded to the sliding frame 6 along a first peripheral region 34 of the window panel 12 and along an edge 36 of the window panel 12.

According to the exemplary embodiment, the window panel 12 has a larger surface area than the window opening 11 of the window-guiding frame 2. This means that, even in the event of the adhesive bonding 20 failing, the window panel 12 cannot fall out of the window-guiding frame 2, and thus out of the rail vehicle. The safety requirements which have to be met by the design of the sliding frame 6 and of the adhesive-bonding surface 20 can therefore be less stringent, since the window-guiding frame 2 serves an additional securing means for the window panel 12.

In a peripheral region 38 of the window opening 11, the window-guiding frame 2 has an all-round seal 40 for sealing the window panel 12. In addition to providing thermal sealing, the seal 40 serves as a mechanically stabilizing supporting element for the window panel 12, which is arranged in the sliding frame 6. For the purposes of sealing the window panel 12, and of supporting the same mechanically, the seal 40 butts against a second peripheral region 42 of the window panel 12. The seal 40 can also serve as damping element in relation to any possible vibration of the sliding frame 6 which may occur when the rail vehicle is traveling.

Although the invention has been specifically illustrated and described in detail by way of the preferred exemplary embodiments, the invention is not restricted by the examples disclosed, and a person skilled in the art can deduce other variations therefrom without departing from the scope of protection of the invention.

The invention claimed is:

1. A window arrangement for a rail vehicle, the window arrangement comprising:
    a window-guiding frame having a window opening;
    a movable sliding frame disposed in said window-guiding frame, said sliding frame having lateral side walls extending in a sliding direction of said sliding frame and each of said lateral side walls having at least one guiding element;
    said sliding frame having a transportation position, said sliding frame having an integrated transportation lock at a top end of each of said lateral side walls, said sliding frame being formed of sheet metal having an aperture laser cut directly in said sheet metal and formed as a screw mount for said integrated transportation lock;
    a window panel disposed in said movable sliding frame, said window panel having at least one open position, a closed position and said transportation position, said window panel having a larger surface area than said associated window opening of said window-guiding frame;
    said sliding frame having a window closure configured for releasably connecting the sliding frame to the window-guiding frame in the closed position;
    said integrated transportation lock configured to be connected to said window-guiding frame in said transportation position of said sliding frame; and
    said integrated transportation lock configured to be screwed to said window-guiding frame in said transportation position.

2. The window arrangement according to claim 1, wherein said sliding frame is laser cut to size.

3. The window arrangement according to claim 1, wherein said sheet metal of said sliding frame angled all around.

4. The window arrangement according to claim 1, wherein said sliding frame delimits a larger surface area than said surface area of said associated window opening of said window-guiding frame.

5. The window arrangement according to claim 1, wherein said window-guiding frame has a periphery, and an all-around seal is in abutment between said window panel and said periphery and is overlapped by said window panel.

6. The window arrangement according to claim 1, which further comprises:
    at least one of guiding elements (8, 10) or locking elements (22, 24) having points of attachment formed integrally with said sliding frame; and
    at least one of a counterweight having points of attachment formed integrally with said sliding frame.

* * * * *